UNITED STATES PATENT OFFICE.

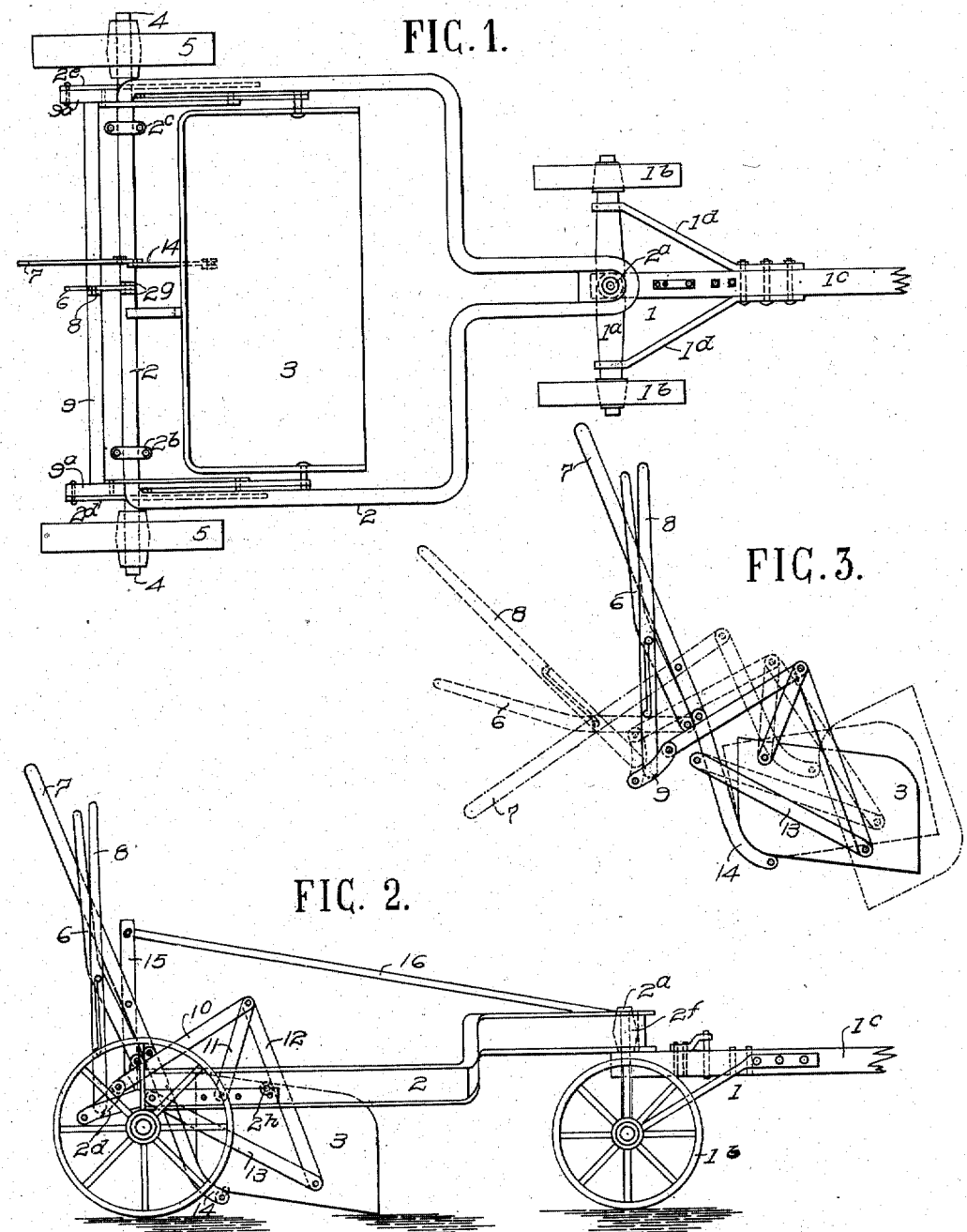

JEFFERSON KINDLEBERGER AND ANDREW J. GRANVILLE, OF SAN DIEGO, CALIFORNIA.

WHEEL-SCRAPER.

983,065.      Specification of Letters Patent.      Patented Jan. 31, 1911.

Application filed November 19, 1909. Serial No. 528,956.

*To all whom it may concern:*

Be it known that we, JEFFERSON KINDLEBERGER and ANDREW J. GRANVILLE, citizens of the United States, and residents of San Diego, in the county of San Diego, State of California, have invented a certain new and useful Improvement in Wheel-Scrapers; and we do hereby declare the following to be a full, clear, and exact description of the invention, such as will enable others skilled in the art to make and use the same.

Our invention relates to wheel scrapers designed more particularly for excavating dirt in roads, as well as other places, and the objects in view are, first, to provide novel means for raising and lowering the scoop; second, to provide means for suspending and locking the scoop so that it can not be accidentally dumped while moving the machine from place to place; third, an easy method of lever manipulation, the manipulator working in opposition to the horses in dumping; and fourth, simpleness of construction throughout. We attain these objects by the mechanism illustrated in the accompanying drawings, in which:—

Figure 1 is a plan view of our wheel scraper complete, Fig. 2 is a side elevational view thereof, showing the scoop down and ready for filling, and Fig. 3 is a detail view of the lever action.

Similar characters of reference refer to similar parts throughout the several views.

The front truck 1, main frame 2, scoop 3, rear axle 4, rear wheels 5, levers 6, 7, and 8 with their connecting bars constitute the principal parts of our wheel scraper.

The front truck 1 is a simple truck composed of an axle provided with wheels $1^b$ and with a central pivot upon which is mounted the tongue $1^c$, some distance above the axle $1^a$ and braced to the axle by means of braces $1^d$. On the central portion of said front truck, and upon the back end of the tongue is pivoted frame 2, by means of the pin $2^a$ which extends down into the truck 1 through a cylindrical piece larger at its central portion as shown best in Fig. 2, which allows the frame 2 to tilt without strain. Said frame is U shaped at its pivot point as shown best in Fig. 1 and extends backward horizontally a short distance, there spreading and angling downward, then each portion is bent at right angles and extends backward to the rear axle 4, and is mounted upon said rear axle and fastened thereto by means of clamps $2^b$ and $2^c$. Said rear axle is supported by the rear wheels 5. Just back of said rear axle is a rocker bar 9, which is fastened to said frame 2 by means of bars $2^d$ and $2^e$, which are riveted to said frame 2, and rocker bar 9 is adapted to rock thereon. To said rocker bar 9 is centrally and rigidly attached lever 8 which operates in connection with another lever 6 attached to the main frame 2 by means of lugs $2^g$. This lever 8 is provided with a long slot which is extended at right angles at each end. In this slot is adapted to operate a bolt rigidly set in the other lever 6, so that upon the operation of either of the levers the pivot points being on a different base cause the bolt to slide in the slot in the lever from one to the other of the right angle turns, the bolt dropping in said turn at each end which locks the levers in such position and causes them to remain so until released by the manipulation of the levers in relation to each other which releases them. On this rocker arm on each end is a bell crank $9^a$ on which is pivoted a bar 10 which extends forward and upward, and is pivoted at its other end upon another bar 11, which extends downward and is pivoted to the frame 2. On the upper ends of the bars 10 and 11 is pivoted another bar 12 which extends downward over a roller $2^h$ and has its lower end pivoted to the scoop, the point of pivot being near the front lower side. At this same point another bar 13 is pivoted, and is also pivoted at its other end on the frame 2. On the under and rear side of the scoop, and centrally located is another lever 14 pivoted and extending upward and pivoted to the extending end of the dumping lever 7, which dumping lever is pivoted upon an upright arm 15 extending centrally from said frame 2. Upon the upper end of said upright arm is attached a brace rod 16 running forward and attached to the pivot bolt $2^a$ in the front truck.

It will readily be seen that with this construction and with the scoop 3 shown in the position as shown best in Fig. 2 that by grasping the dumping lever 7 and pulling backward, the rear side of the scoop will be elevated and the front side descend upon the pivot point as shown by dot and dash lines in Fig. 3, and that after it has reached a certain point of said action, that by a quick thrust it will completely upset and that by forward motion of said lever it will be thrown back into the position shown in Fig. 2, also that the levers 6 and 8 on the back being unlatched and operated in relation to each other, the scoop may be raised with very little effort on the part of the operator to the position desired for carrying the load, and as easily lowered to its scraping position.

Having thus described our invention what we claim as new and desire to secure by Letters Patent is:—

1. A wheel scraper comprising a front truck, a main frame pivotally mounted thereon, said frame mounted upon suitable rear wheels, a scoop mounted on said frame by means of four bars pivoted at each of their ends, and two of them pivoted on said frame, one of said bars being pivoted upon a rocker arm which in turn is attached to a rocker lever, and all adapted to raise and lower said scoop and to lock it in its raised and lowered positions, a double pivoted lever pivoted on said scoop and upon an upright arm upon said frame adapted to dump said scoop, all substantially as set forth.

2. A wheel scraper comprising a front truck, a main frame pivotally mounted thereon, and provided with a pivot point adapted to relieve any torsional strain on said frame, a scoop pivotally mounted upon said frame and adapted to be raised and lowered by means of a rocker arm, a crank thereon, a bar pivoted on said crank, and on another bar pivoted on the main frame, another bar pivoted on said bars, and on the front portion of the scoop, and another bar pivoted at said point and back on the frame, means for operating and locking said scoop in its raised and lowered position, suitable wheels under said frame, a double actuating lever pivoted on the main frame and adapted to dump said scoop, all substantially as set forth.

3. In a wheel scraper the combination of a main frame, a lever pivoted on said frame, another lever operating in connection with said lever by means of a bolt rigidly mounted on the first mentioned lever, and a slot extending longitudinally in the second mentioned lever with right angle turns at each end of said slot, and means connected to said lever for raising a scoop, said scoop, a lever pivoted on said frame, a bar pivoted on said last mentioned lever and upon the lower back portion of said scoop adapted to dump the scoop, all substantially as set forth.

In testimony whereof, we affix our signatures in the presence of two witnesses.

JEFFERSON KINDLEBERGER.
ANDREW J. GRANVILLE.

Witnesses:
MILTON H. McCLURE,
CLAUD T. DAVENPORT.